April 21, 1970     W. KRUSCHWITZ     3,507,085
FLANGE MOUNTING CLAMPING SECTION
Filed Feb. 5, 1968
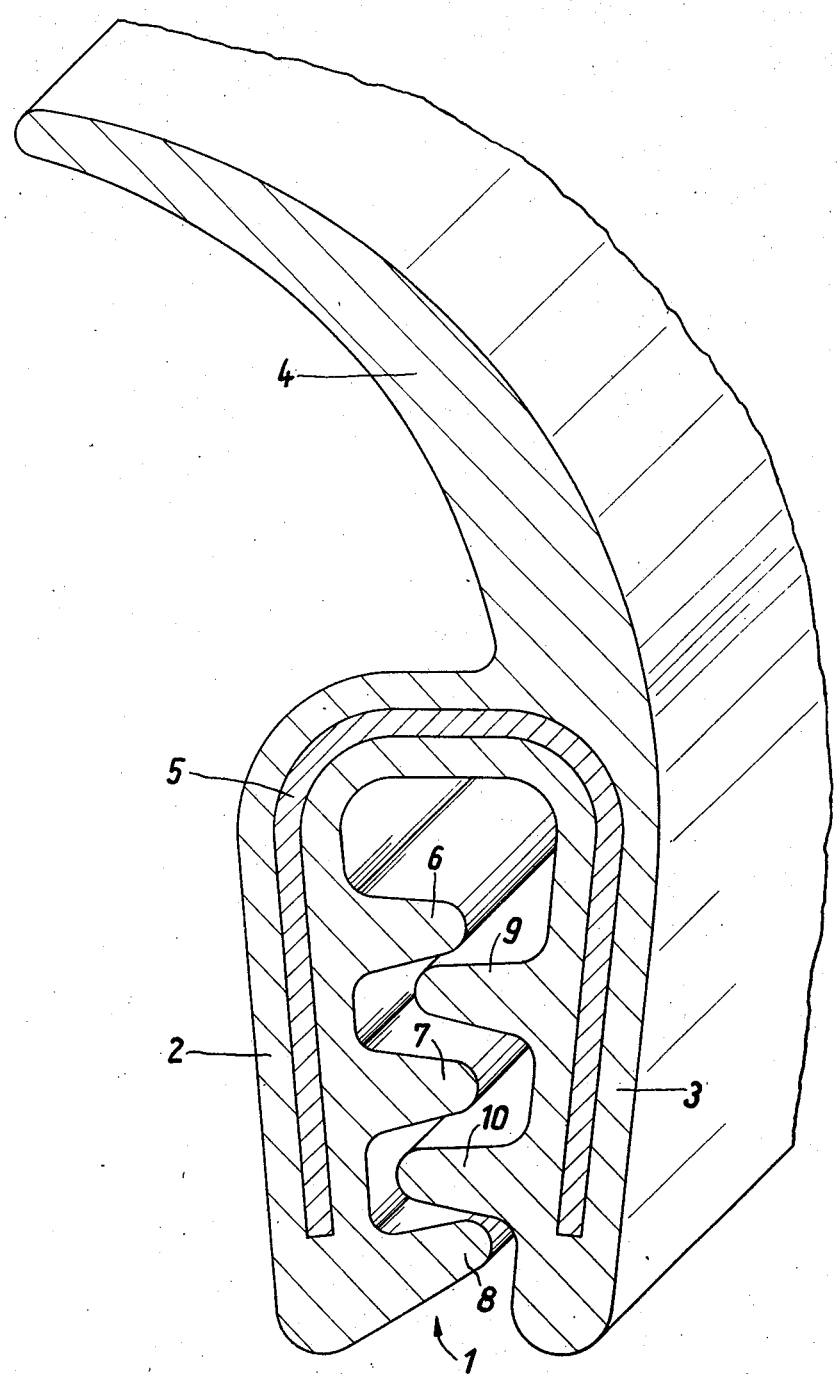
Inventor:
WERNER KRUSCHWITZ
William Frederick Werner
ATTORNEY

United States Patent Office 3,507,085
Patented Apr. 21, 1970

3,507,085
FLANGE MOUNTING CLAMPING SECTION
Werner Kruschwitz, 79 Brehmstrasse,
4 Dusseldorf, Germany
Filed Feb. 5, 1968, Ser. No. 703,120
Claims priority, application Germany, Feb. 10, 1967,
D 35,066
Int. Cl. E04b 1/66; E04f 19/06
U.S. Cl. 52—716                              3 Claims

ABSTRACT OF THE DISCLOSURE

This specification discloses a flange mounting clamping section of resilient material and of U shaped cross section with the sides of the U converging towards the free edges. One flange carries three inwardly extending ribs and the other two ribs with the ribs being interleaved when the section is unstressed but portions of ribs on the flanges being in opposed relation when the section is distorted to bring the flanges into a substantially parallel relation.

---

This invention relates to sealing sections, strips and the like and particularly to a clamping section member for sealing or decorative strips in windows or doors.

It is known for sealing or decorative strips for windows and doors, more particularly of vehicles, to be embodied as flange-mounting U-shaped section members which are made of rubber or a similar flexible material, such as plastics, the section-member arms having clamping ribs on their inside. Conventionally, the ribs have a nose-like shape.

It is an object of this invention to improve retention of the section member on the flange. More particularly, the invention obviates tilting of the section member on the flange, facilitates assembly, and leads to a firmer engagement than with sections known heretofore.

According to the present invention there is provided a flange-mounting U-shaped clamping section member for use as a sealing or decorative strip on windows and doors and having clamping ribs on the interior surface and formed from resilient material, characterised in that the section member has at least two clamping ribs for each limb of the U-shaped section member, the ribs extending substantially perpendicularly upwards from the inside surfaces of the limbs and having side surfaces which are at a slight inclination to one another.

In one embodiment of the invention, when the section member is in the unstressed state i.e. when it is not in position on the flange—merely the most outwardly disposed ribs are slightly inclined towards the interior of the section member. The section height of the ribs is approximately from one to three times the thickness of the flange and also corresponds substantially to the thickness of the arms of the section member. Consequently, arm thickness and rib height are approximately 2 to 3 mm. in the section members conventional for vehicle windows. The section member is made of rubber or some other resilient material, more particularly a plastics material.

According to a further embodiment of the invention, the ribs of the two arms of the section member are substantially in pitch offset to one another when the section member is in the unstressed state. Conveniently in this case, one arm of the section member comprises one rib more than the other arm; for instance, one arm of the section member comprises three ribs and the other arm comprises two ribs. When the section member is in this expanded operative state, the section-member arms, which when in the unstressed state are substantially in pitch offset to one another, extend substantially parallel to one another and all the ribs bear on the flange at the same pressure.

Conveniently, the rubber or plastics section member according to the invention has in known manner a flexible metal insert.

The invention will now be described with particular reference to the accompanying drawing which is a sectional view of an embodiment of the invention.

A U-section member 1 adapted to be pushed onto a bearing flange (not shown) is made of rubber or some similar flexible material, more particularly plastics and has arms 2, 3 and, for instance, a sealing lip 4 produced unitarily with the arms. A flexible metal insert 5 is embedded in the member 1.

Disposed on the inside of the arm 2 are a number of ribs 6, 7, 8 which are in pitch offset to further ribs 9, 10 disposed on the arm 3. When the section member 1 is in the unstressed state shown in the drawing, the ends of the arms 2, 3 are at a slight inclination to one another and the ribs take up a position of two meshing gear-wheels or racks.

The shape of the ribs 6–10, instead of being the conventional nose-like shape, is such that the ribs project substantially perpendicularly from the inside surface of the arms 2, 3 and their side surfaces extend at a slight inclination to one another towards the terminal edge. The terminal edges are rounded. When the member is in the position shown, merely the most outwardly disposed rib 8 is slightly inclined towards the interior of the member 1.

When the arms 2, 3 are spread apart from one another and engaged on a flange, the ribs are to some extent moved out of the gap between the oppositely disposed ribs, so that some of their inside edges are then opposite one another and all the ribs bear on the flange with a uniform pressure. More particularly, when the member is in the pulled-on i.e. expanded-state, the rib 8 is opposite the rib 10 and the rib 7 is opposite the rib 9. When the member 1 is in this expanded state, the arms 2, 3 extend substantially parallel to one another.

I claim:
1. For use as a sealing or decorative strip on windows and doors in vehicles, a flange mounting clamping section of resilient material comprising a member of U-shaped cross section including side flanges which, in an unstressed condition converge towards their free edges, three ribs on the inner face of one of said flanges in spaced relation and extending into the space between said flanges with one of said ribs being substantially at the free edge of the flange from which it extends, said ribs being substantially normal to the flange from which they extend; and two ribs on the inner face of the other of said flanges offset with respect to the said three ribs and in an unstressed state of said member extending into the spaces between said three ribs, said two ribs also being substantially normal to the flange from which they extend, with portions of the ribs on one flange being disposed opposite to portions of ribs on the other flange when said member is mounted on a flange and thereby distorted into a position in which said flanges are substantially parallel.

2. The flange mounting clamping section of claim 1 in which each rib has opposite faces that converge towards its free edge.

3. The flange mounting clamping section of claim 1 in which a metallic insert is embedded in the U-shaped member.

References Cited

UNITED STATES PATENTS

| | | | |
|---|---|---|---|
| 2,542,077 | 2/1951 | Gershen. | |
| 3,222,769 | 12/1965 | Le Plae | 52—716 X |
| 3,310,928 | 3/1967 | Weimar | 52—716 |
| 3,363,364 | 1/1968 | Cadiou | 52—716 X |
| 3,363,390 | 1/1968 | Crane et al. | 52—403 X |

FOREIGN PATENTS

| | | |
|---|---|---|
| 1,102,045 | 2/1968 | Great Britain. |
| 1,337,947 | 8/1963 | France. |

FRANK L. ABBOTT, Primary Examiner

S. D. BURKE III, Assistant Examiner

U.S. Cl. X.R.

52—403, 627